US007848541B2

(12) United States Patent
Gural (10) Patent No.: US 7,848,541 B2
(45) Date of Patent: Dec. 7, 2010

(54) DIFFERENTIAL PHASE CORRELATION (75) Inventor: Peter S. Gural, Sterling, VA (US)

(73) Assignee: Science Applications International Corporation, San Diego, CA (US)

(*) Notice: Subject to any disclaimer, the term of this patent is extended or adjusted under 35 U.S.C. 154(b) by 946 days.

(21) Appl. No.: 11/682,020

(22) Filed: Mar. 5, 2007

(65) Prior Publication Data
US 2008/0218594 A1 Sep. 11, 2008

(51) Int. Cl.
G06K 9/00 (2006.01)
H04N 7/18 (2006.01)
(52) U.S. Cl. .................. 382/107; 348/154; 348/155
(58) Field of Classification Search .............. 73/488; 348/154, 155, 169; 356/27; 382/107, 236, 382/284
See application file for complete search history.

(56) References Cited

U.S. PATENT DOCUMENTS

2003/0090593 A1* 5/2003 Xiong ..................... 348/620
2009/0213234 A1* 8/2009 Chen et al. ............... 348/208.4

OTHER PUBLICATIONS

A Projection-Based Extension of the Phase Correlation Method, Keller, et al., Submitted to the IEEE Transactions on Signal Processing, Dec. 2003, pp. 1-13.
Projection-based, frequency-domain estimation of superimposed translational motions, Peyman Milanfar, vol. 13, No. 11/Nov. 1996/J. Opt. Soc. Am. A., pp. 2151-2162.
Pseudopolar-Based Estimation of Large Translations, Rotations, and Scalings of Images, Keller, et al., IEEE Transactions of Image Processing, vol. 14, No. 1, Jan. 2005, pp. 12-22.
Correspondence, An FFT-Based Technique for Translation, Rotation, and Scale-Invariant Image Registration, Reddy, et al., IEEE Transactions on Image Processing, vol. 5, No. 8, Aug. 1996, pp. 1266-1271.
Registration of Multi-Dimensional Image Data Via Sub-Pixel Resolution Phase Correlation, Hoge, et al., p. 707-710 of Proc. IEEE International Conf Image Processing. Barcelona, Spain, Sep. 14-17, 2003.
A Three Frame Algorithm for Estimating Two-Component Image Motion, Bergen, et al., IEEE Transactions on Pattern Analysis and Machine Intelligence, vol. 14, Issue 9 Sep. 1992, pp. 886-896.
Mechanisms for Isolating Component Patterns in the Sequential Analysis of Multiple Motion, Burt et al., Visual Motion, 1991, Proceedings of the IEEE Workshop, pp. 187-193, Oct. 1991.

(Continued)

*Primary Examiner*—John B Strege
*Assistant Examiner*—Nirav G Patel
(74) *Attorney, Agent, or Firm*—Banner & Witcoff, Ltd.

(57) ABSTRACT

Acceleration of a set of three frames of video with N movers may be determined by generating an inverse Fourier transformation of a differential phase correlation matrix of the three frames. The resultant acceleration estimate may be integrated with the velocity and offset estimates for the second frame so as to provide an offset estimate for the third frame. The third frame may then be co-registered with a reference frame. This process may be repeated for subsequent frames so that subsequent frames may also be registered to the reference frame so that video jitter that was caused by platform shake may be reduced or eliminated.

22 Claims, 7 Drawing Sheets

OTHER PUBLICATIONS

Extension of Phase Correlation to Subpixel Registration, Foroosh, et al., Image Processing, IEEE Transactions on, Publication Date Mar. 2002, vol. 11, Issue 3, pp. 188-200.

A Subspace Identification Extension to the Phase Correlation Method, Hoge, IEE Transactions on Medical Imaging, vol. 22, No. 2, pp. 277-280, Feb. 2003.

Computing Occluding and Transparent Motions, Irani, et al., International Journal of Computer Vision (IJCV), vol. 12, No. 1, pp. 5-16, Feb. 1994.

Principle of Superposition: A Common Computational Framework for Analysis of Multiple Motion, Shizawa, et al., Proceedings of the IEEE Workshop on Visual Motion, 1991, Published Oct. 1991, pp. 164-172.

* cited by examiner

DPCM Formulation
$$Q' = F_k F^*_{k+1} F^*_{k+1} F_{k+2} / |F_k| |F_{k+1}|^2 |F_{k+2}|$$

2D IFFT

DIFFERENTIAL PHASE CORRELATION

The U.S. Government has a paid-up license in this invention and the right in limited circumstances to require the patent owner to license others on reasonable terms as provided for by terms of a government contract.

BACKGROUND OF THE INVENTION

1. Field of the Invention

The present invention relates to the field of video stabilization and more particularly to the field of registering frames of video.

2. Description of Related Art

As is known, a video consist of a series of frames taken over time. For example, a sensor can be used that captures an image and the image can be saved as one of a series of frames in some form of memory. By taking a series of frames over time, such as 30 frames per second, a video may be formed that can be watched by a user. In order for the sensor to function, typically the sensor is mounted in a housing and an optics module is used to focus the desired image in the focal plane on the sensor so that the image can be processed and stored. The housing, optics module and the sensor are part of the platform and the overall system is familiar to a person of skill in the art. However, one potential problem is that if the platform is shifted while the image is being captured, the captured imaged will reflect the platform shift and repeated platform movement (platform shake) can introduce undesirable jitter that can make it difficult to watch the resultant video. This issue is common in aircraft mounted platforms and is also prevalent with video captured with portable, hand-held video platforms such as camcorders that are inherently problematic from a standpoint of platform shake.

To compensate, some video platforms include a mechanism to estimate and correct for platform shake. One approach is to attempt to compensate for platform shake by attempting to isolate the optics and sensor movement from the housing movement. Vibration damping and gyroscopes can be used to help stabilize the optics and sensor but this approach makes the hardware more expensive. Another approach is to use an oversized image sensor and couple the image being recorded to one or more accelerometers so that movement of the platform can be compensated by appropriately chipping out a shifted portion of the image that is being recorded. As can be appreciated, however, both of these techniques require specialized hardware and once the video is taken it is generally not possible to use these techniques to correct platform shake that is still perceptible.

Another method of compensating for platform shake has been to use software to register consecutive frames to the focal plane. As the software method works on frames that are previously captured, the software method can be used in substantially real-time or as a post-processing step at some later point. Traditionally, however, it has been both computationally expensive and algorithmically difficult to register consecutive frames containing multiple movers. A common approach has been to segment different movers and through a number of steps isolate the background movement and remove the translation associated with the background so as to register consecutive frames. While this works relatively well for one or two movers, this method has proven to be difficult when numerous individual movers are included in the frame along with, for example, changes in shadows and the like. Registration is even more difficult if non-uniform transparencies such as suspended condensed water vapor or suspended particulates (e.g., clouds or smoke) are also present in the frame. Therefore, improved methods of compensating for platform shake (e.g., to remove background displacement between frames) would be beneficial so as to help register consecutive frames of video.

BRIEF SUMMARY OF THE INVENTION

Acceleration of a background may be determined from three consecutive frames of video. According to some embodiments, the three consecutive frames K, K+1 and K+2, which may include N movers, undergo two-dimensional Fourier transformation (2D FT) and a derivative phase correlation matrix formed from the three resultant two-dimensional transforms that were generated. In an embodiment, an inverse Fourier transform of the derivative phase correlation matrix is computed and the resultant peak location provides the acceleration of the background over the three images. By integrating the acceleration of the background at frame K+2 and combining with a previous velocity estimate for frame K+1, a current velocity of the background movement associated with the frame K+2 may be determined (integration may be implemented via a running sum of discrete values). A second integration of the current velocity of the background at frame K+2 combined with the previous displacement of frame K+1 may be used to determine the positional offset of the background at frame K+2. In an embodiment, the positional offset may be computed relative to the starting reference frame K. Repeating this process with the next three frames K+1, K+2 and K+3 provides the acceleration of frame K+3 and this acceleration can be used to determine the positional offset of frame K+3 as discussed above. This process may be repeated by incrementing the frames and determining the positional offset of the background for subsequent frames until the video sequence is exhausted. The positional offsets of the background can be used to register the sequence of video frames. In an embodiment, the derivative phase correlation matrix is in the frequency domain and normalized to unity resulting in only phase components so as to compensate for sensor platform translational movement. In another embodiment, the phase correlation matrix is in the frequency domain and processed with magnitude components so as to compensate for rotational and/or scale changes caused by platform spin and zoom movements.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In order to compensate for platform shake one assumption that is typically made is to consider movers in the video as having constant velocity over a period of two or three frames. This assumption may also be made herein because over the period of three or less frames the velocities of each mover are relatively constant for typical video frame rates.

It should be noted that while registering subsequent frames to the focal plane has been a long standing goal, when multiple movers are involved it has historically been difficult to determine the difference between movement in the frame based on the velocities of movers within the focal plane and jitter caused by the platform shake (e.g., the background movement). Typically, each mover had to be segmented and the movement associated with the background had to be determined. Once the background movement was determined, it could be removed and the frames could be co-registered to produce a stabilized video sequence.

This time consuming and computer intensive process made it difficult to provide such functionality in a substantially real-time manner (e.g. with minimal lag between the video capture and the displaying of the video) with a reasonable level of processing power (such as a commonly available desk-top computer with the equivalent of a 3 GHz PENTIUM 4 processor). Of course, dedicated hardware could improve the response time but such hardware is less common and therefore it would be helpful if the removal of background jitter could be done with the processing power of a more widely available general purpose computer.

Figure 1:
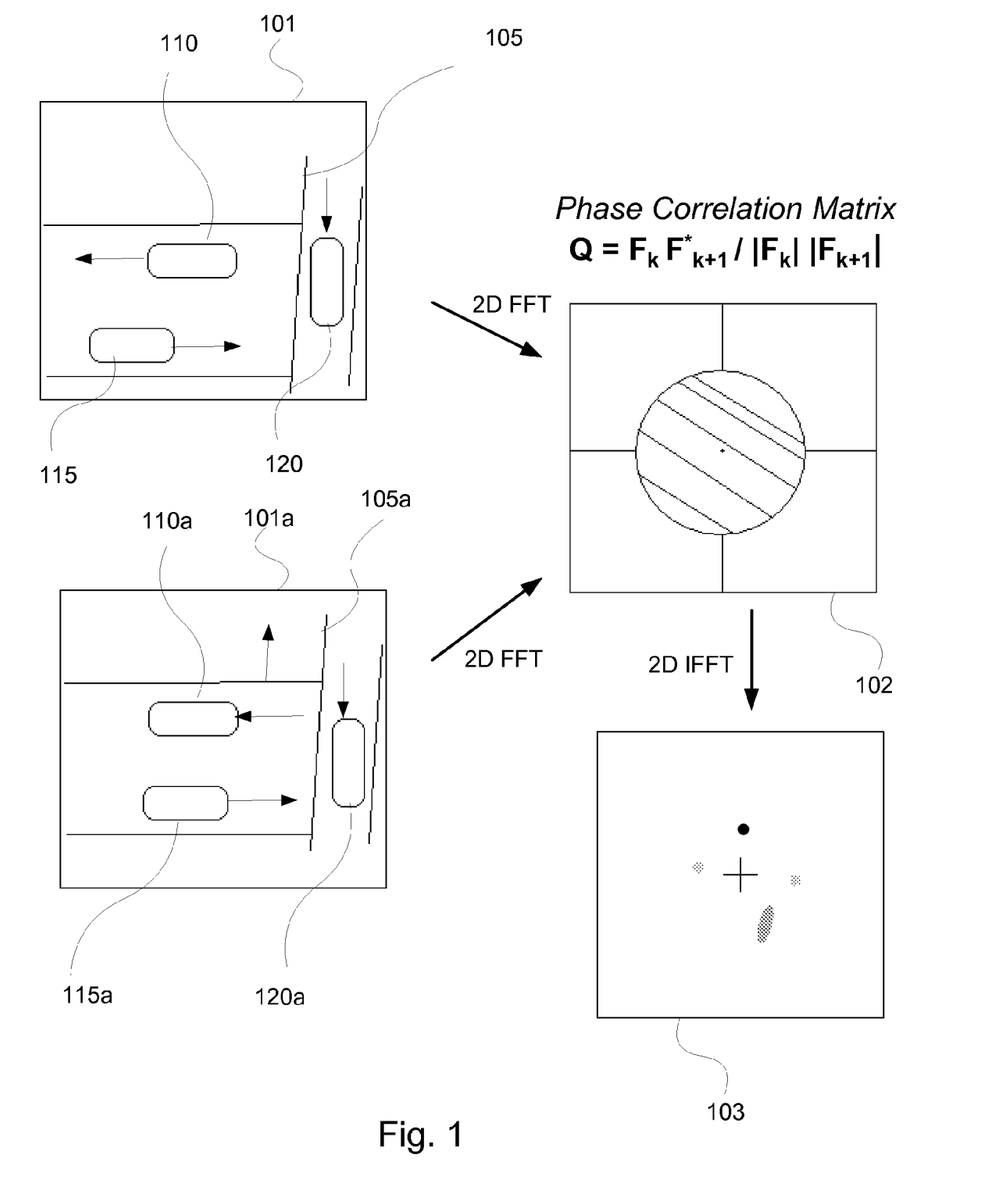
FIG. 1 illustrates a schematic diagram of a method of determining a displacement between consecutive frames that may be used in accordance with one or more aspects of the present invention.

FIG. 1, for example, illustrates a typical problem. A first frame 101 is shown with a background 105 and includes a first mover 110, a second mover 115 and a third mover 120. A second frame 101a is shown with the background 105a and a first mover 110a, a second mover 115a and a third mover 120a all translated with respect to the first frame 101. One approach to registering consecutive frames so as to compensate for platform shake has been to generate a two dimensional fast Fourier transform (2D FFT) of the frame so as to transform the image from a spatial domain to a frequency domain. If this is done, the two frames can be combined using the normalizing formula Q to form a phase correlation matrix, where Q is formed on a frequency element by frequency element basis using the formula:

$$Q = F_K F^*_{K+1} / |F_K||F_{K+1}|$$

In the above equation, $F_K$ is the 2D FFT of frame 101 into the frequency domain; $F_{K+1}$ is the 2D FFT of frame 101a and $F^*_{K+1}$ is the complex conjugate of $F_{K+1}$. The resultant phase correlation matrix Q will show a phase ramp between the two frames with the phase slope proportional to the translational offset between the two frames if there is only a single translation in the sequence. As is known, the center of Q represents lower frequencies while the outer edge represents the higher frequencies (such as noise and spatial aliasing components). A typical illustration of such a matrix may include a series of banded colors near the center of the matrix that repeat as the phase wraps through two pi while exhibiting more random colors near the outer edge. To control the abrupt spatial edges of the image border from aliasing into the lower frequency portions of Q, an apodizing filter is typically applied to the spatial imagery prior to Fourier transformation.

There exist several methods to estimate the phase slope of the phase correlation matrix Q, which can then be converted to a displacement offsets for the vertical and horizontal motions independently. These include 1) the use of a singular value decomposition to find the phase slope of the singular vectors associated with the most significant singular value, 2) the use of an auto-regressive method reducible to a frequency domain sliding block correlation, which produces a phase function versus block separation, and 3) the application of a two-dimensional inverse Fourier transform (2D IFT) directly to the Q matrix, whose relative peak position to the image center yields the translational offset in pixels. When a 2D IFT is performed on the phase correlation matrix Q to move it back into the spatial domain, the resultant intensity complex 103 will contain small values except for a peak represented by the displacement that is needed to shift the two frames so as to remove the translation that occurred between the two frames. Thus, if a 2D IFT is performed, it becomes a relatively straightforward matter to determine the needed translation and shift the frame 101a so that both frames 101, 101a are registered. Furthermore, because the phase correlation matrix Q is normalized to unity, the translational estimates are invariant to intensity changes between the frames. However, because the frames 101/101a include multiple movers, the intensity complex 103 generated by the 2D IFT will include a number of significant localized peaks and therefore introduces ambiguity as to which translation is the translation associated with the change in position of the background (the removal of which will substantially eliminate the jitter caused by the platform shake). It should be noted that while the fast Fourier transform is being discussed, Fourier transform (FT) and fast Fourier transform (FFT) can be used interchangeably. The more generalized case of FT is suitable for arbitrary sized image portions whereas for computational efficiency the FFT can be used if the image portion includes dimensions with a power-of-two size (e.g., 256 by 512 pixels).

Figure 2:
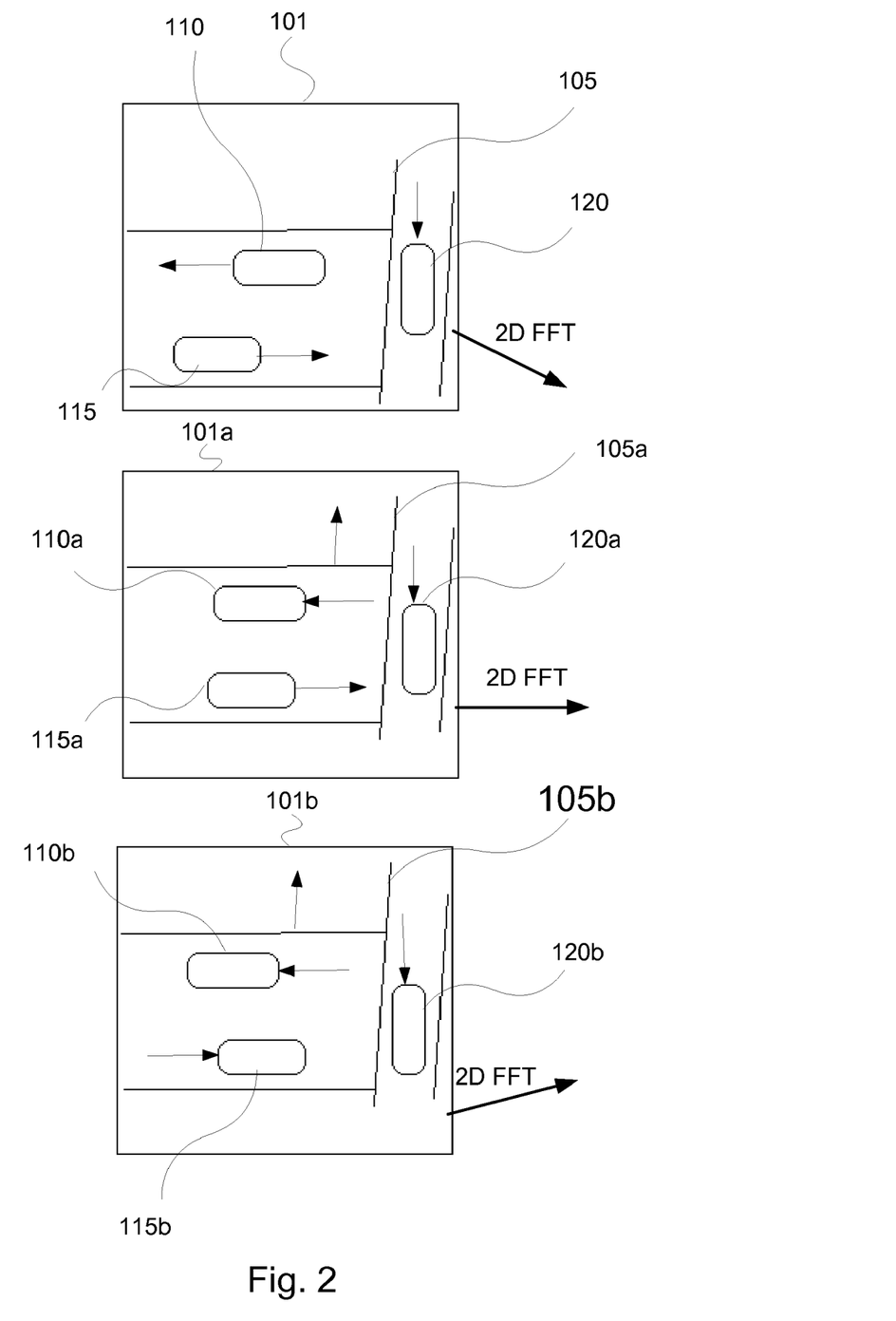
FIG. 2 illustrates a schematic representation of three consecutive frames of a video that may be used in accordance with one or more aspects of the present invention.
Figure 3:
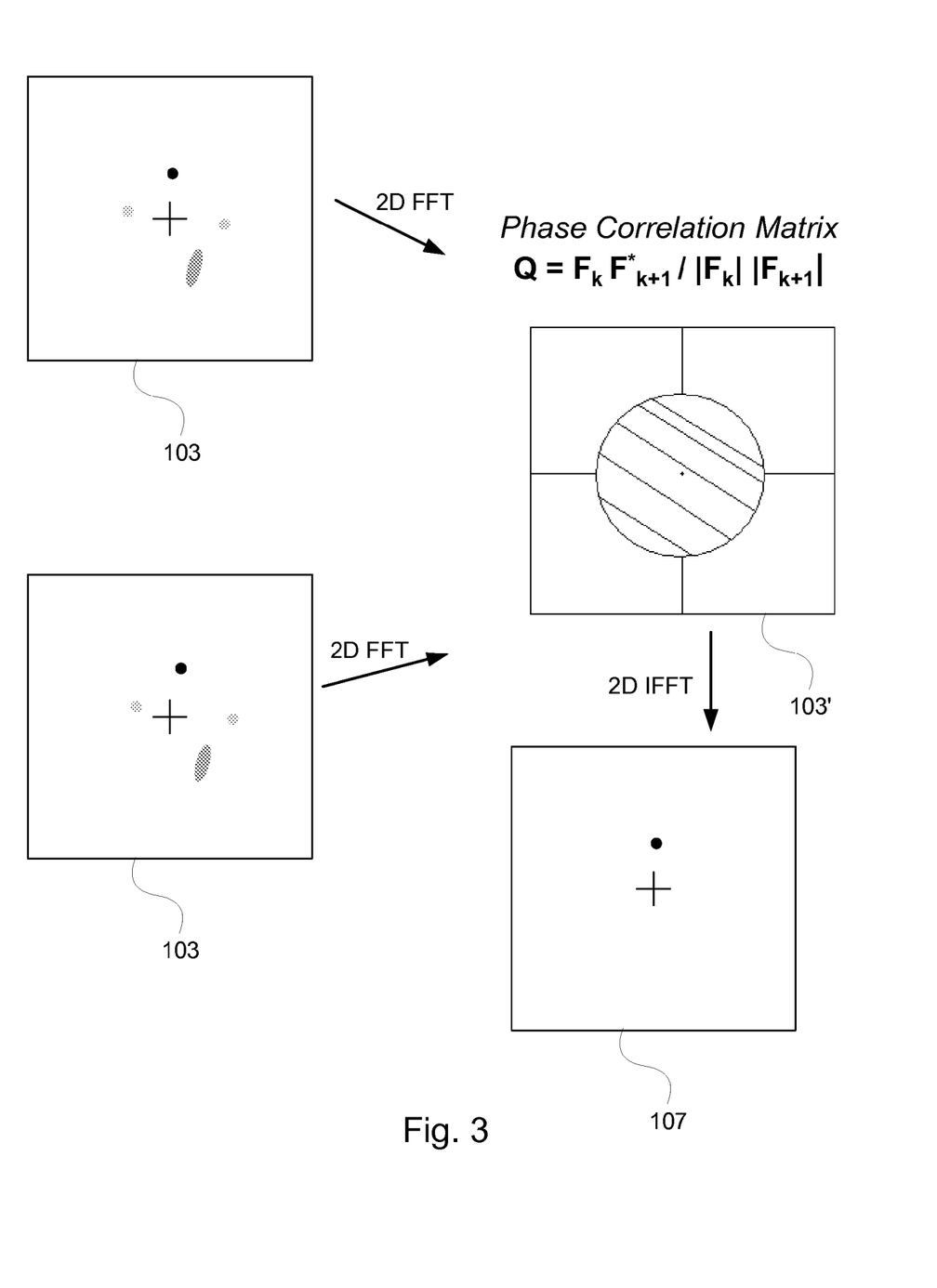
FIG. 3 illustrates a schematic diagram of a method of determining an acceleration between three consecutive frames that may be used in accordance with one or more aspects of the present invention.

While conventional practice would be to isolate the movers and determine which mover represented the background, such methods are computationally expensive and are difficult to use for more complex cases such as frames that include moving transparency such as fog or smoke obscuring a scene containing a large number of movers. It has been determined that for three consecutive frames (101, 101a and 101b as depicted in FIG. 2), if the above translation estimation process is done for the first two frames K and K+1 to form an intensity complex 103 and then the process is repeated for frames K+1 and K+2 to form a second intensity complex 103a (as pictured in FIG. 3), the two intensity complexes will have the same pattern but the pattern will have shifted. Therefore, the method discussed with respect to FIG. 1 can be repeated on the two intensity complexes 103, 103a to form another phase correlation matrix Q 103' (FIG. 3). When the inverse FT is taken, the resultant image 107 will include a single dominant peak but this point will now represent the acceleration of the three frames. By integrating the acceleration (adding to it the previous velocity $V_{K+1}$), a velocity $V_{K+2}$ can be determined and associated with the motion between frames K+2 and K+1. If the velocity $V_{K+2}$ is integrated (added it the displacement $D_{K+1}$ of the frame K+1), the displacement $D_{K+2}$ can be determined and used to register the frame K+2.

Figure 4:
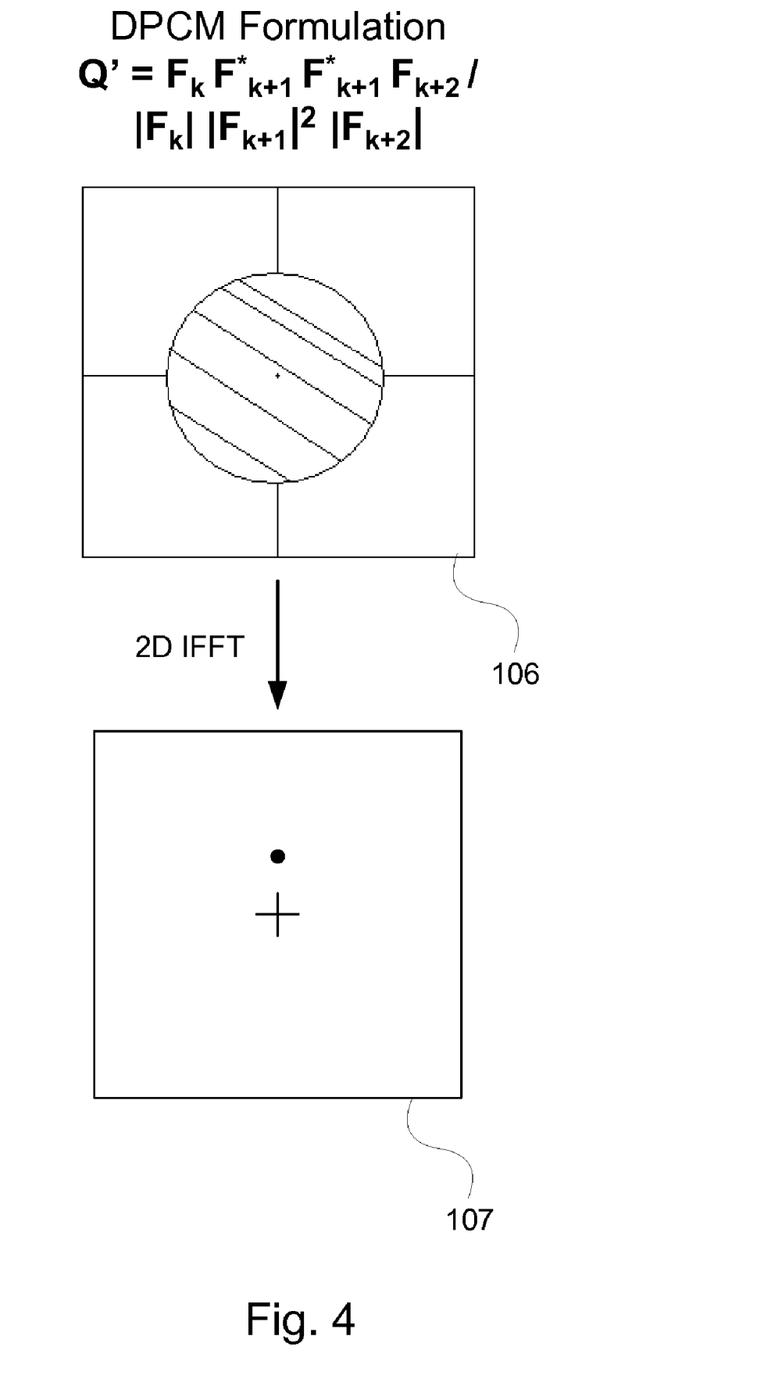
FIG. 4 illustrates another schematic diagram of a method of determining an acceleration between three consecutive frames that may be used in accordance with one or more aspects of the present invention.

While such a process is relatively efficient, because of the properties of fast Fourier transformations, this process can be reformulated to taking the 2D FFT of each frame 101, 101$a$ and 101$b$ and forming a differential phase correlation matrix (DPCM) 106-(Q') (see FIG. 4)—using the formula Q', where Q' is defined as follows:

$$Q' = \frac{F_K F_{K+1}^* F_{K+1}^* F_{K+2}}{|F_K||F_{K+1}^*|^2|F_{K+2}|}$$

It should be noted, however, that either method of generating the DPCM (either directly using Q' or combining pairs of Q matrices) will work.

The phase slope of the DPCM can then be determined and the phase slope may be converted to acceleration. As discussed above, various methods of determining the phase slope exist such as, without limitation, the use of a singular value decomposition, the use of an auto-regressive method, and use of the inverse Fourier transform. When, for example, the DPCM is converted back to the spatial domain by using the inverse 2D FFT, the image 107 will show a single significant peak representative of the acceleration of the three frames K, K+1, K+2. Integrating will give $V_{K+2}$, as discussed above. It should be noted that integrating always generates a constant, commonly referred to as C. To address the constant C for the first set of frames that are processed in the DPCM process, starting values of zero for the velocity and displacement may be chosen and the first estimate of acceleration can be assumed zero. Alternately, the velocity between frames one and two may be estimated independently and this estimate can be used to provide the starting values. Subsequent frames may then use the previously determined values of displacement and velocity as the basis for the offsets for those subsequent frames. Table 1 shows a frame by frame example of the integration steps to form the final displacement estimates relative to an initial reference frame (number 1 in the example provided by Table 1).

TABLE 1

| Frame Number | Acceleration (pixels/frame$^2$) | Velocity (Pixels/frame) | Displacement (pixels) |
| --- | --- | --- | --- |
| Initialize | 0 | 0 | 0 |
| 1 | 0 | 0 | 0 |
| 2 | (x2 − x1) | x2 − x1 | x2 − x1 |
| 3 | (x3 − x2) − (x2 − x1) | x3 − x2 | x3 − x1 |
| 4 | (x4 − x3) − (x3 − x2) | x4 − x3 | x4 − x1 |
| 5 | (x5 − x4) − (x4 − x3) | x5 − x4 | x5 − x1 |

The DPCM algorithm may start its acceleration estimation at frame number 3 by estimating the acceleration between frames 1, 2, and 3 (shown as x3−2*x2+x1 in Table 1). This is added to the previous velocity estimate from frame 2 to form the velocity estimate between frames 3 and 2. Next, the displacement from frame 2 is added to the new velocity estimate of frame 3 to form the displacement estimate for frame 3. Thus, in the depicted embodiment, the resultant displacement estimate is relative to the first frame in the sequence. This sequence of operations may then be repeated for each subsequent frame number (i.e. acceleration estimate from DPCM, integration to provide a velocity estimate, and integration to provide the displacement estimate). It should be noted that as the displacement for each frame is determined, subsequent frames may be registered relative to a reference frame to produce a stabilized image sequence. The reference frame is typically chosen to be the first frame in the video sequence. Note that the estimate of acceleration of the platform at frame 2 shown in this example was the displacement between frames 1 and 2. If the estimate of displacement between frames 1 and 2 is not available, then the acceleration estimate for the platform at frame 2 could be replaced with zero, resulting in an initial bias offset carried through the sequence of the displacements over all subsequent frames. It should be noted the above table is shown for the x or horizontal motion displacement. Thus, it is contemplated that there is an equivalent sequence of operations for the y or vertical displacement.

It should be noted that linear smear (or blur) that changes between frames during the initial image capture process can induce undesirable phase jumps in the phase correlation matrix that seriously degrade phase slope estimation performance. For linear smear this manifests itself as integer times pi abrupt phase jumps in Q or Q'. To alleviate this problem, each complex element of the phase correlation matrix or differential phase correlation matrix, can be replaced by a complex number with the same amplitude but double the phase value prior to the phase slope estimate and then the final acceleration estimate halved to correct for the phase doubling.

The above method works well for estimating the translation of frames subsequent to the second frame up until, and including, the last frame, however, because of the unknown constant generated by integration, the estimate for the second frame is incomplete. However, in an example where there are 30 frames per second, the displacement between the first and second frames will likely be relatively insignificant for most videos and therefore any translation that might occur between the first and second frame can be ignored and assumed zero. It is noted that other assumptions about the displacement of the second frame relative to the first frame may also be used as desired and should have a minimal effect on the process given the number of frames per second that are typically involved in video collections.

Figure 5:
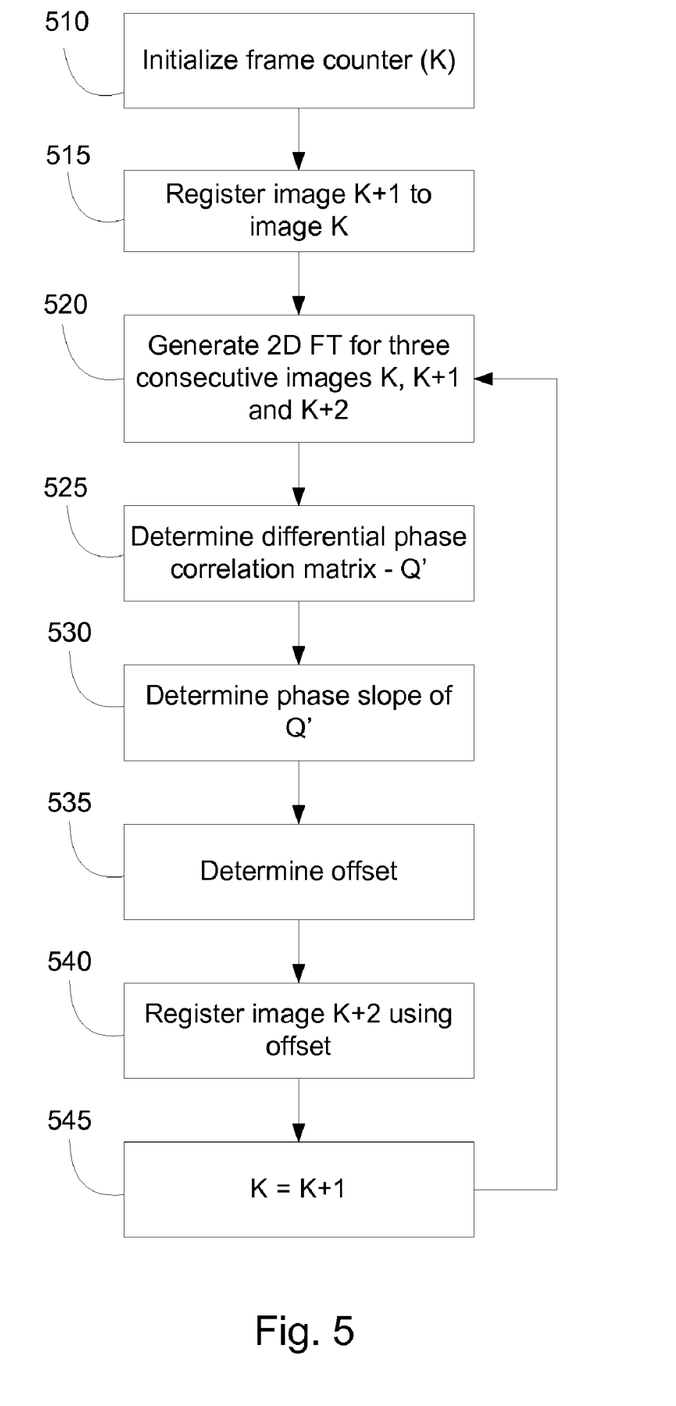
FIG. 5 illustrates a method of registering consecutive frames that may be used in accordance with one or more aspects of the present invention.

FIG. 5 represents an illustrative method for determining the positional offset of a series of consecutive frames. First in step 510, the frame counter K is initialized (e.g., set to zero). Then in step 515, image K+1 is registered to image K. As discussed above, this may be done by estimating the velocity and/or displacement of frame K+1, by assuming some initial condition such as zero velocity and displacement or by some other desirable method.

Then in step 520, a 2D FT of three consecutive frames K, K+1 and K+2 is generated. It can be appreciated that, as discussed above, the 2D FT can be replaced with a 2D FFT for improved computation efficiency. In addition, as discussed further below, the frames used to generate the 2D FT may be a portion of the entire video frame. Because of how a 2D FT is generated, the generation of a 2D FT is well suited to be done in parallel by a plurality of processors. Using a plurality of processors may allow for the use of processors running at lower frequency while still providing real-time conversion, thus providing a more computationally efficient method for generating the 2D FTs. As can be appreciated, the parallel generation can be done for a particular 2D FT or multiple 2D FTs can be generated at the same time. In addition, in the subsequent step, two out of the previous three frames are used again in the calculation of Q' and thus their 2D FTs need not be recomputed if they had been saved during the previous step. Thus, a recursive expression can be formulated that requires only a single 2D FT to be generated for each new frame processed in order to form the Q' matrix.

Next in step 525, a DPCM, such as DPCM 106, is generated. As noted above, this generation may include replacing the complex number with a complex number of the same amplitude and double the phase so as to mitigate phase jumps that may be introduced by linear smear or blur. If this is done, the final acceleration may be halved to correct for the phase doubling. In step 530, the phase slope is estimated. In an embodiment, an inverse 2D FT of the DPCM is performed to generate an image 107 with a single significant peak, the resultant peak representing the acceleration of the three frames. Thus, steps 520-530 represent an embodiment of determining an acceleration of the background of three frames. As discussed above, however, other methods of determining the phase slope may be used.

In step 535, the offset of frame K+2 is determined. In an embodiment, the acceleration is integrated twice to determine an offset $D_N$ associated with the frame K+2, and the offset may be stored, for example, in a table for future use. It should be noted that a number of methods of determining displacement based on an acceleration value exist and this invention is not considered limited in that regard. In addition, the velocity of the background between frames K+1 and K+2 may also be stored in the table. As can be appreciated, the stored velocity and offset displacement can be used when determining the displacement of the next frame (K+3 in the current example).

Next, in step 540, frame K+2 is registered with frame K. As can be appreciated, this step can include rendering of the frames in their new, registered position. As can be appreciated, this improves the quality during subsequent playing of the video because the frames are in the registered position and platform shake is accounted for. In an alternative embodiment, the offset for each file could be saved in a Meta file and the process of displaying the images could use the data in the Meta file to appropriately position the images during playback of the video. The advantage of storing the offset in Meta data is that the video itself is not modified and therefore the originally captured video is preserved. This also allows for a comparison between the estimation accuracy of two different sized frames. For example, the displacement offset of an 128 by 128 pixel sized frame could be compared to the displacement offset of a 256 by 256 pixel sized frame to see if the additional size provided an appreciable difference in offset estimation. However, either process is considered registering for the purpose of this application unless otherwise noted.

Then, in step 545, the value for K is incremented and the process may be repeated for subsequent frames in the video. This process may be continued until there are no more frames to register. Therefore, an additional step may include a check to verify that another frame exists. In an alternative embodiment, if an additional frame does not exist then the attempt to create a 2D FT of frame K+2 will fail and the process may be considered complete.

It should be noted that applying this method to consecutive frames provides acceptable accuracy for most conditions and situations. However, if reduced computation effort is desired for a particular application, then less than every frame may be used. For example, in an embodiment every other frame may be used to determine the acceleration and the resultant displacement for a frame can be halved for the frame that was not considered. Thus, if frame x, x+2 and x+4 were used to determine acceleration, a displacement for frame x+4 could be determined. Then the difference in the displacement between frame x+2 and x+4 could be halved and used for frame x+3. As can be appreciated, other variations are also possible. It should be noted that increasing the number of frames that are considered weakens the assumption that movers in the frame have a constant velocity, thus such a modification is more suitable to situations where the movers in the frame are moving at a relatively constant velocity over a larger number of frames.

In addition, while current processors such as are available in desktop PCs can handle processing of images in substantially real-time for reasonably sized portions, conversion of video to a particular codec (such as converting a video in a first codec to a second, more compression-efficient, codec) may be desired to be done significantly faster than real-time (e.g. at a speed substantially higher than thirty frames per second). Therefore, it may be desirable to allow for the selection of portions (groups of consecutive frames) of the video for registering. This could be done by the user or some automated process such as a periodic check of the acceleration between three consecutive frames to determine if the acceleration was above a desired maximum threshold level. In such a process, the additional processing used to register frames could be omitted unless it was determined to be beneficial for the computational cost.

It should be noted that the process illustrated in FIG. 5 may include additional steps. For example, while the process works well to register consecutive frames and provide the desired pixel registration accuracy for pleasing video playback, the process is less accurate with respect to absolute registration and there is the potential for the frame to drift due to error in the acceleration estimates. While it is expected that the drift may average out over time, such drift may be undesirable. Therefore, filters such as a first order response filter may be used to detrend any accumulation in bias in registration back toward zero. Other filters and steps may also be used as desired, as is conventional in post-processing of frames to a person of skill in the art.

It should be noted that when this process is applied, a certain level of image erosion will occur at the edges due to the registration of frames. While this is unavoidable, one possible method of addressing the issue is to add a mask that occludes the erosion on the edges. The masking, which in an embodiment may be turned on or off, allows a cleaner video to be watched but naturally results in the loss of details at the edges. However, the removal of platform shake more than compensates for the loss of information, especially when the platform is subjected to significant and erratic translation. An over-sized sensor may also be used to help compensate for erosion due to platform jitter.

It should also be noted that, as is common in methods of registering frames, intentional panning should be taken into account for situations where the platform moves the focal plane intentionally. For such situations, a well known filter can be used so as to prevent the image from being eroded. This invention is not limited with respect to the type of filter being used to prevent erosion of the image due to intentional panning.

Once the frames are registered, they may then be rendered. Rendering as used herein includes storing the frame in a memory, displaying the frames or transmitting the frames to another location.

While the video may include a large number of pixels in each frame (such as sufficient pixels to provide 1920 by 1080 high definition HD non-interlaced video, for example), the process of removing or compensating for platform shake may be performed on less than all the pixels in the frame. While accuracy can be improved if additional pixels are used for the translation estimation, a portion of the frame that is 128 pixels by 128 pixels can typically be used to provide an acceptable level of accuracy in the displacement offset estimate with a preference for sizes that are powers of two for Fourier transform efficiency. It is noted that for 256×256 pixels sized regions, the above discussed process is still suitable for real-time computations with conventional desk-top resources circa 2006 while providing increased accuracy. It should be noted that an advantage of this method is that more than one level of frame registration can be done, thus a first pass could be done with a portion that is 128 pixels by 128 pixels and if it was later determined that greater registration accuracy was desired a larger portion of the frame could be used, up to the entire frame size. However, for larger frames it is unlikely that using the entire frame with the method such as is depicted in FIG. 5 will allow for real-time frame registration with conventional desk-top computers available in 2006 because of the time needed to transform the image into the frequency domain.

Figure 6:
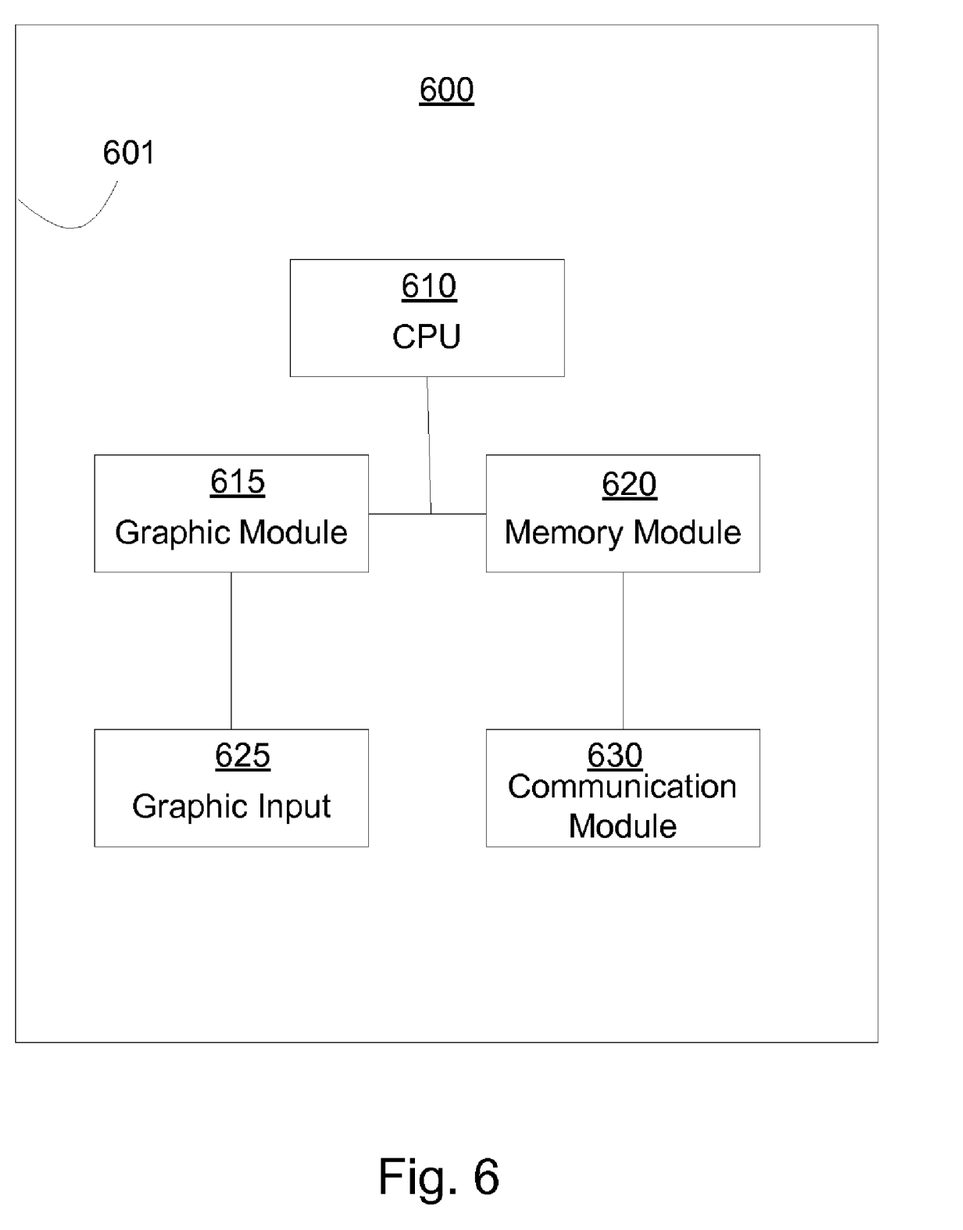
FIG. 6 is a schematic representation of a processing device that may register consecutive frames in accordance with one or more aspects of the present invention.
Figure 7:
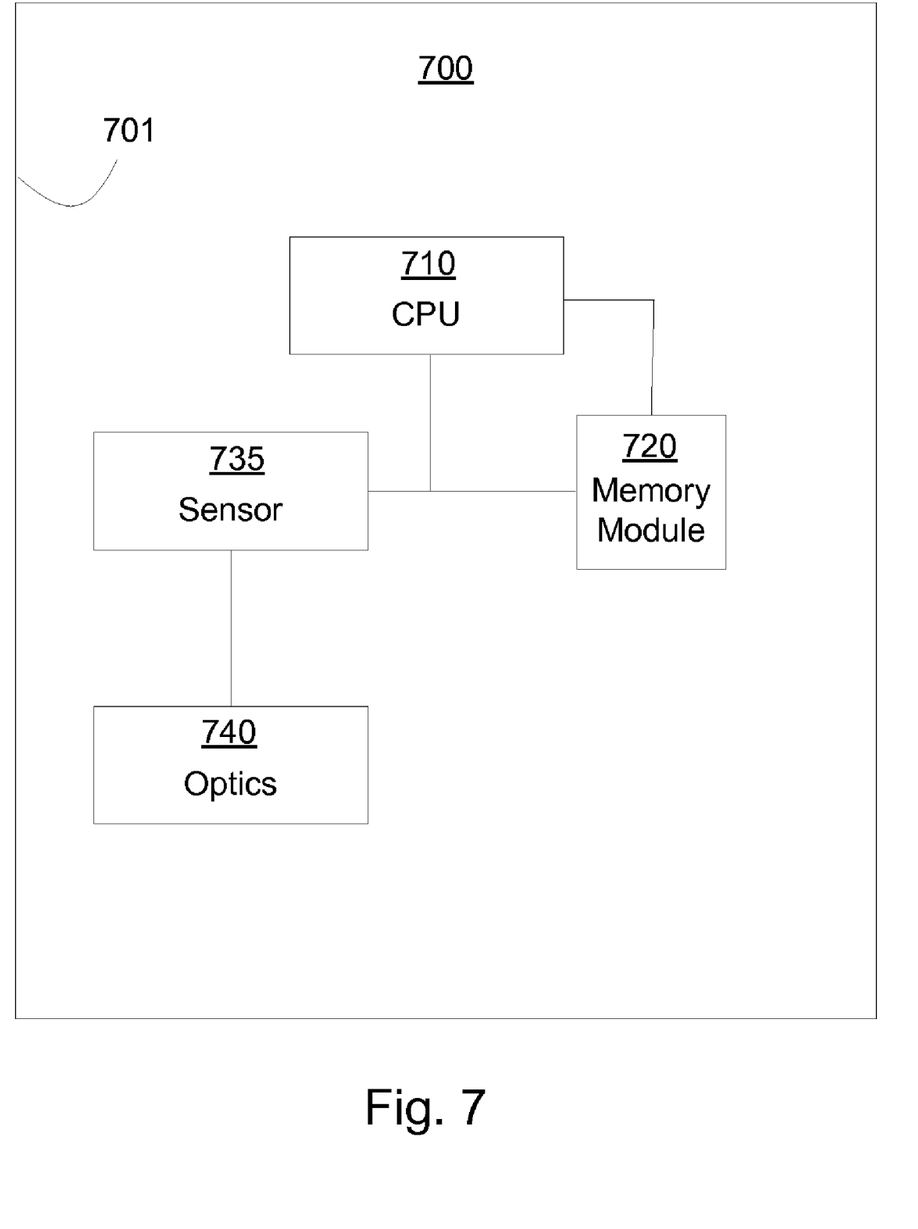
FIG. 7 is a schematic representation of a video capturing platform that may capture and register frames in accordance with one or more aspects of the present invention.

FIGS. 6 and 7 illustrate schematic illustrations of embodiments of hardware that may be used, although numerous other configurations would also be suitable. In FIG. 6, a computer 600 includes a housing 601 that includes a CPU 610, a graphic module 615, a memory module 620, a graphic input 625 and a communication module 630. It should be noted that the various elements, which are shown in communication, can be coupled in a wired or wireless manner and the housing 601 may be plurality of housings coupled via a desired communication channel. In addition, the communication connections between depicted elements are merely representative and other communication channels may be used as desired. The graphic input 625 may be a known hardware component such as a component input or digital video input (DVI) that allows video signals (in either analog or digital form) to be received by the computer 600. The graphics module 615, which may be combined with the CPU 610 and is therefore a logical element rather than requiring a physical element, can be used to convert the received analog video signal into a digital signal. The digital signal (e.g., the series of digital video frames) may then be processed as discussed above by registering the frames with the CPU 610 and storing them in the memory module 620.

In an alternative embodiment, the communication module 630, which may include any desired hardware port such as an Ethernet port, a USB port or Firewire port, may receive an encoded digital representation of the video signal. The encoded video signal, which can be converted to desired codecs as needed, can then be processed by the CPU 610 to address platform shake as discussed above or it can be stored in the memory module 620 for later processing. It is expected that certain delivery mechanisms, such as high speed connections with efficient compression codecs, for digital delivery can provide digital video frames faster than the CPU 610 can process and register them (perhaps substantially faster than real time). Therefore, the video may be stored in the memory module 620 prior to processing and registering. However, depending on the CPU 610 and other components, the processing and storing can be done in substantially real-time. Thus, FIG. 6 illustrates an embodiment that allows for post-processing of video, either in substantially real time or potentially at a later time. It should be noted that a memory module, such as memory module 620, may be a combination of any known memory types such as random access memory, sequential access memory, volatile memory and non-volatile memory without respect to the storage medium. Furthermore, the memory module may include computer executable instructions for causing the CPU 610 to perform desired steps. As can be appreciated, the embodiment depicted in FIG. 6 is relatively unlimited in processing power as the CPU 610 can be a plurality of processors in a known configuration such as, but not limited to, a cluster of CPUs operating in parallel, thus the embodiment depicted in FIG. 6 can offer relatively high levels of accuracy in frame registration in real-time or even faster.

It should be noted that if desired, the graphics module can encode the video signal in a format that reduces memory storage requirements, such as but not limited to, H.264, VC-1, MPGx or any other desirable encoding format. Likewise, encoded video, which may already be in an encoded format, can be encoded in a new format during the process of compensating for platform shake. Thus, video could be provided in a first format, such as MPEG2, and platform shake could be compensated for during the conversion to a second format such as H.264.

In FIG. 7, the platform 700 includes a housing 701 that includes a CPU 710, a memory module 720, a sensor 735 and optics 740. As is known, the optics 740 directs images on the sensor 735, the sensor 735 captures the images into a series of frames and the frames are stored in the memory module 720. Thus, FIG. 7 illustrates an embodiment where the platform shake can be removed while the video is being stored in the memory module. As discussed above, the memory module 720 may be a combination of different types of memory mediums. Similarly, the CPU 710 may also be a combination of different types of processors. For example, to improve efficiency, the CPU 710 can include one or more specialized FFT chips to help provide substantially real-time reduction of video jitter at relatively lower power consumption levels. As can be appreciated, the two embodiments can also be used in combination. For example, a first level of compensation for platform shake could be accomplished on the platform itself (which could be done via the above method or some other method) and then a second level could be done when the video signal was transmitted to a computer for post-processed and/or encoding.

While most platform shake can be treated as image translation over the course of three frames, it is also possible to compensate for rotational shifts and changes in scale (which are less likely to be a disturbing factor for most video) by converting the frame to polar coordinates (for example via interpolation) and using a 2D FT to transform the polar spatial image into the frequency domain and processing the magnitude portion of the complex values generated. Rotational movement and scale changes can be determined in a manner similar to the translational method by unwrapping the polar representation into a Cartesian grid and taking the inverse FT to identify the significant peak with one axis offset representing rotation and the orthogonal axis representing scale. As before, the intensity complex resulting from frames K and K+1 can be compared to the intensity complex of K+1 and K+2 with a second round of 2D FT transformations that are then combined using the phase correlation matrix to determine the offsets. When this second phase correlation matrix is subjected to an inverse FT, the resultant image will contain a peak at the point representing the angular and scaling accelerations. These accelerations can be integrated to determine the angular velocity and rate of change of scale and an integration applied again to determine an angular offset and scale change between two frames. Combined with the translational offsets, the complete affine transformation between two frames is known.

Thus, in a manner similar to the method in disclosed in FIG. 5, the angular offset and scale change between two consecutive frames can be determined. Naturally, a different set of equations are used but the process of determining the acceleration of three frames and then integrating twice to determine the velocity and displacement is essentially the same. The conversion of phase slope to translation, rotation, and scale is published and known to someone of skill in the art.

It should be noted that an advantage of the embodiment depicted in FIG. 6 is that translation can be compensated for first and, if further improvements are required, rotation movement and scale changes can be compensated for at a later time so as to provide an affine transformation. Similarly, if the initial estimate for acceleration and offset based on an initial number of pixels fails to provide the desired reduction in jitter, a larger number of pixels could be used to improve frame registration. Of course, while general purpose computers can provide acceptable performance with the depicted methods, dedicated FT hardware, such as dedicated FFT hardware, could allow for higher frame rates and/or the use of larger portions of the full image frame so as to provide greater accuracy in frame registration.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method of compensating for video platform instability, comprising:
   (a) receiving video input;
   (b) determining an acceleration of a first background in a first frame based on three frames, wherein one of the three frames is the first frame;
   (c) determining an offset of the background in the first frame based on the acceleration of the background in first frame and a velocity and a position of a background in a preceding frame, the preceding frame being another of the three frames; and
   (d) registering the first frame based on the determined offset.

2. The method of claim 1, wherein the three frames are three consecutive frames and the first frame is the last frame of the three consecutive frames.

3. The method of claim 1, wherein the determining of the acceleration in (b) comprises:
   (i) generating a differential phase correlation matrix based on a two-dimensional Fourier transformation of each of the three frames; and
   (ii) determining a phase shift of the differential phase correlation matrix.

4. The method of claim 3, wherein a phase component of each element in the differential phase correlation matrix is doubled and the determined acceleration is halved to account for the phase doubling, whereby the effects of linear smear or blur in the determined acceleration of the background of the first frame may be reduced.

5. The method of claim 1, wherein the determining of the offset in (c) comprises:
   (i) determining a velocity of the background of the first frame based on integration of the acceleration of the background in the first frame, the determining using the velocity of the background in the preceding frame; and
   (ii) determining the offset of the background of the first frame based on integration of the velocity of the background of the first frame, the determining using the position of the background in the preceding frame.

6. The method of claim 1, wherein the receiving in (a) comprises capturing consecutive images with an image sensor and an optics system and the registering in (d) is done in real-time.

7. The method of claim 1, wherein each frame includes at least three movers and at least one of the at least three movers consists of a non-uniform transparency.

8. A non-transitory computer readable medium having computer executable instructions for causing a processor to: (a) generate three two-dimensional Fourier transformations of three consecutive frames K, K+1 and K+2; (b) generate a differential phase correlation matrix based on the three two-dimensional Fourier transformations; (c) take an inverse Fourier transformation of the differential phase correlation matrix and integrate twice to determine a first background offset for frame K+2; (d) register the frame K+2 based on the first background offset; (e) generate a two-dimensional Fourier transformation of a frame K+3; (f) repeat (b)-(c) for consecutive frames K+1, K+2 and K+3 to determine a second background offset for frame K+3; and (g) register the K+3 frame based on the second background offset.

9. The non-transitory computer readable medium of claim 8, wherein the K, K+1 and K+2 frames of (a) are, respectively, a first portion of a first larger frame, a second portion of a second larger frame and a third portion of a third larger frame.

10. The non-transitory computer readable medium of claim 9, wherein the first portion, the second portion and the third portion are at least 128 pixels by 128 pixels.

11. The non-transitory computer readable medium of claim 9, wherein the first portion, the second portion and the third portion are at least 256 pixels by 256 pixels.

12. The non-transitory computer readable medium of claim 8, wherein the differential phase correlation matrix of (b) is based on the equation $F_K F^*_{K+1} F^*_{K+1} F_{K+2} / |F_K| |F_{K+1}|^2 |F_{K+2}|$, and wherein $F_K$ is a Fourier transform of the K frame, $F_{K+1}$ is the Fourier transform of the K+1 frame, $F^*_{K+1}$ is a complex conjugate of the Fourier transform of the K+1 frame and $F_{K+2}$ is a Fourier transform of the K+2 frame and wherein the Fourier transform is from a spatial domain to a frequency domain.

13. The non-transitory computer readable medium of claim 8, wherein the computer executable instructions are configured for a plurality of distinct processors, whereby the Fourier transform is done in parallel on the plurality of distinct processors.

14. The non-transitory computer readable medium of claim 8, wherein the two-dimensional Fourier transformations are two-dimensional fast Fourier transformations.

15. A method of compensating for video platform instability, comprising:
   (a) transforming a first frame, a second frame and a third frame into the frequency domain;
   (b) generating a first differential phase correlation matrix based on the first frame, the second frame and the third frame;
   (c) using a first phase slope of the first differential phase correlation matrix to determine an acceleration for the third frame;
   (d) determining a first offset of the third frame based on the determined acceleration of the third frame;
   (e) registering the third frame based on the first offset;
   (f) transforming a fourth frame into the frequency domain;
   (g) repeating steps (b)-(d) with a second differential phase correlation matrix to determine a second offset for the fourth frame, the differential phase correlation matrix including the second frame, the third frame and the fourth frame, the fourth frame being subsequent to the third frame;
   (h) registering the fourth frame based on the second offset.

16. The method of claim 15, further comprising:
(i) repeating (b), (c), and (d) for subsequent frames to determine subsequent velocities and offsets for the subsequent frames; and
(j) registering the subsequent frames based on the offsets.

17. The method of claim 16, wherein the registering in (h) is done in real-time during video capture.

18. The method of claim 15, wherein the first and second offsets are an offset type that is selected from the list consisting of a translational offset, a rotational offset and a scaling offset.

19. The method of claim 15, wherein the offset is corresponding to a translation offset, the method further comprising repeating (a)-(h) for one of a rotation offset and a scale offset.

20. The method of claim 15, wherein the transforming in (b) comprises:
(i) taking a two-dimensional fast Fourier transform of the first frame, the second frame and the third frame; and
(ii) combining the transforms based on the formula $Q'=F_K F^*_{K+1} F^*_{K+1} F_{K+2}/|F_K||F_{K+1}|^2|F_{K+2}|$, wherein $F_K$ is a fast Fourier transform of the first frame, $F_{K+1}$ is the fast Fourier transform of the second frame, $F^*_{K+1}$ is a complex conjugate of the fast Fourier transform of the second frame and $F_{K+2}$ is a fast Fourier transform of the third frame.

21. The method of claim 15, wherein the transforming in (a) is done by one of a plurality of processors working in parallel and a dedicated fast Fourier transformation hardware chip.

22. The method of claim 15, further comprising:
(i) using a filter to compensate for an accumulation of bias.

* * * * *